Aug. 10, 1926.
L. I. SIEVEN
1,595,930
DEVICE FOR MOUNTING DISK VEHICLE WHEELS
Filed March 8, 1926
*Fig. 1,*
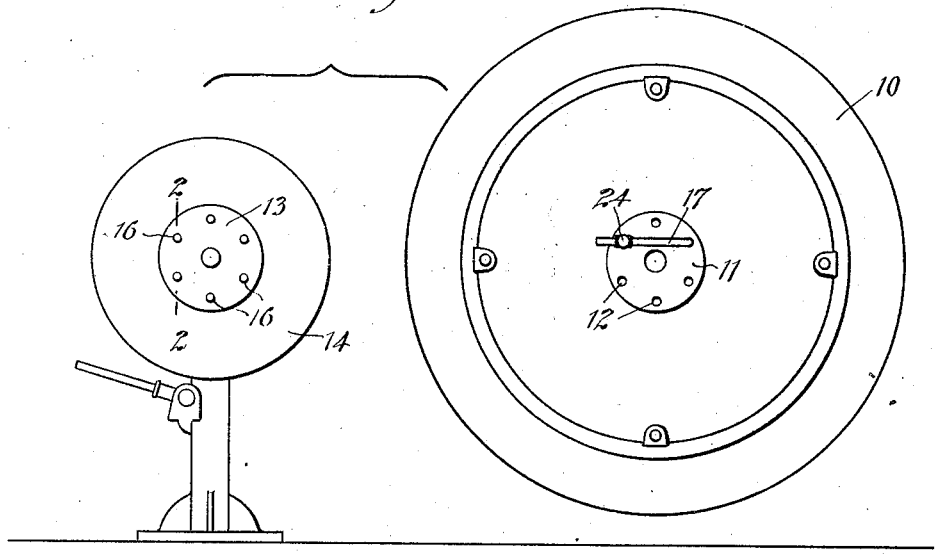
*Fig. 2.*
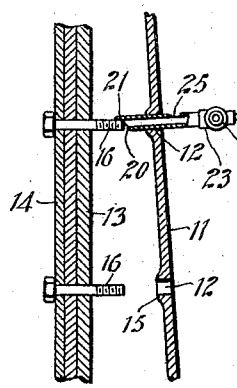
*Fig. 3.*
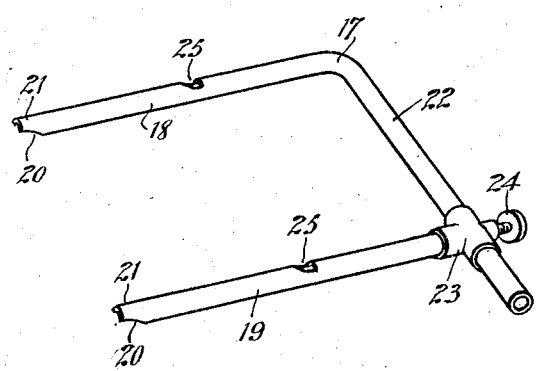
WITNESSES
Edw. Thorpe
Chris Feinle
INVENTOR
Louis I. Sieven
BY
ATTORNEYS Patented Aug. 10, 1926.

1,595,930

UNITED STATES PATENT OFFICE.

LOUIS I. SIEVEN, OF BROOKLYN, NEW YORK.

DEVICE FOR MOUNTING DISK VEHICLE WHEELS.

Application filed March 8, 1926. Serial No. 93,356.

This invention relates to a device for mounting a vehicle wheel.

Some of the objects of the present invention are: to provide a device capable of being used for facilitating the mounting of a vehicle wheel of the disk type on its attaching studs; to provide a device of the indicated character in which the vehicle wheel will be slid easily and conveniently in a manner to bring the stud openings in the disk thereof in registration with the studs carried by the hub of the wheel structure when it is desired to secure the wheel operatively in place; to provide a device of the indicated character which will limit the sliding movement of the vehicle wheel in a direction opposite to that in which it moves for application to the studs; and to provide a device of the indicated character which will include guiding and aligning members, one of which is adjustable so that the device may be employed in conjunction with a vehicle wheel and regardless of the distance between selected bolt holes in the hub portion thereof.

With the foregoing, other objects of the invention will appear from the embodiment of the invention, which, by way of example, is described in the following specification and illustrated in the accompanying drawing; in which:

Figure 1 illustrates two stages in the mounting of a vehicle wheel with the device of the present invention applied.

Fig. 2 is a fragmentary sectional view taken on the line 2—2 of Fig. 1 and showing the vehicle wheel disk as it is being slid toward the hub carrying the studs for the registration of the stud holes in the wheel disk with said studs.

Fig. 3 is a perspective view of the device per se.

As before stated, the present invention contemplates the mounting of a vehicle wheel, especially one of the disk type as shown at 10 in Fig. 1 of the drawing. Such wheel is usually provided with a central hub section as at 11, having a circumferential series of openings 12 spaced equidistantly. Usually the wheel hub is brought against a second hub section such as the one shown at 13, either mounted on a spindle or on a brake drum such as the one indicated at 14. The hub section of the wheel disk is usually provided with an annular raised portion or individual bosses at the bolt openings at 15 to insure an even and proper application of the wheel. It has been found difficult to bring about the registration of the studs upon which the wheel is mounted and the openings in the hub section of the wheel, and especially is this so because of the raised portion 15. The studs 16 upon which the wheel is mounted, are usually permanently carried by a part of the wheel structure which is not removed, such as the hub section 13. The studs 16 correspond in number to the openings 12 and are similarly spaced. The features of construction and arrangement described are true generally of wheel structures now in use, especially disk wheel structures. To overcome the disadvantages experienced in mounting a wheel of the indicated character there is provided the device of the present invention presently to be described.

In the present instance, the device 17 of the present invention is substantially of U-shape to provide guiding and aligning members 18 and 19 which are similar in construction and one of which, the member 19, is adjustable with respect to the member 18. The free extremity of each of the members 18 and 19 is cut away as at 20 at an angle, and being of tubular construction in the present instance an arcuate or concaved terminal 21 is provided on each of the members 18 and 19. In order that the member 19 may be adjusted with respect to the member 18 there is provided a means, which, in the present instance consists of an extension 22 on the member 18 which is substantially right angularly disposed with respect thereto, a T-fitting 23 carried by the member 19 through one portion of which the extension 22 slidably extends, and a set screw 24 carried by the fitting 23. The set screw 24 serves for maintaining the member in any desired position of adjustment. The members 18 and 19 may be separated to the desired degree commensurate with the distance between any two of the openings 12 in the hub section of the wheel 10. These members are then extended through the particular openings. With the device 17 in the hands of a person, the wheel 10 may be lifted and the extremities 21 may be positioned on the particular studs 16 whose relative disposition corresponds to the relative disposition of the openings through which the members 18 and 19 extend. The wheel may then be slid toward the studs which results in absolute registration of the studs 16 with all of the openings 12. In that way the wheel 10 is conveniently and easily mounted on the studs to which the usual holding nuts may be applied. In order to prevent the wheel from sliding toward the hands of the person holding the device, each of the members 18 and 19 is provided with a notch 25 which will limit sliding movement of the wheel in a direction away from the terminals 20.

It is to be understood that the invention is not restricted to the precise provision and arrangement of parts shown and described, as changes, alterations and modifications within the scope of the claims hereunto appended, may be resorted to whenever it is deemed desirable or necessary.

I claim:

1. For use in mounting a vehicle wheel on the securing studs of the wheel structure, a device including guiding and aligning members, each of said members adapted to receive the side portion of one of the studs and thus be held against lateral movement, and the said member adapted to be extended respectively through openings in the hub of the wheel.

2. For use in mounting a vehicle wheel on the securing studs of the wheel structure, a device including guiding and aligning members, each of said members having an extremity concaved or recessed to receive a portion of one of the studs and thus be held against lateral movement with respect thereto, and the said members adapted to be extended respectively through openings in the hub of the wheel.

3. For use in mounting a disk vehicle wheel upon the securing studs of the wheel structure, a device including spaced members each adapted to be extended through an opening in the hub of the wheel and permit the hub portions to slide on said members toward the extremities thereof, each extremity of the members adapted to receive a portion of one of said studs, said members when thus extended and positioned serving to cause the registration of the studs with the openings in the hub of the wheel.

4. A substantially U-shaped device including spaced guiding and aligning members disposed substantially in parallelism, the extremity of each of said members adapted to receive a portion of a stud or the like.

5. A substantially U-shaped device including spaced guiding and aligning members disposed substantially in parallelism, the extremity of each of said members being concaved transversely.

6. A substantially U-shaped device including spaced guiding and aligning members disposed substantially in parallelism, the extremity of each of said members being concaved transversely, and means adjustably supporting one of said members.

7. A substantially U-shaped device including spaced guiding and aligning members disposed substantially in parallelism, the extremity of each of said members being concaved transversely, and means adjustably supporting one of said members and each of said members having holding notches.

LOUIS I. SIEVEN.